May 23, 1933.　　C. E. LEWIS ET AL　　1,909,973
VAPORIZER
Filed March 2, 1931
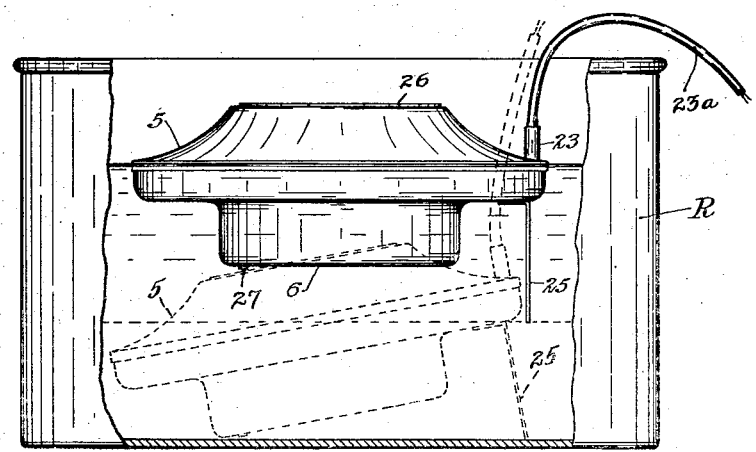
Fig. 1
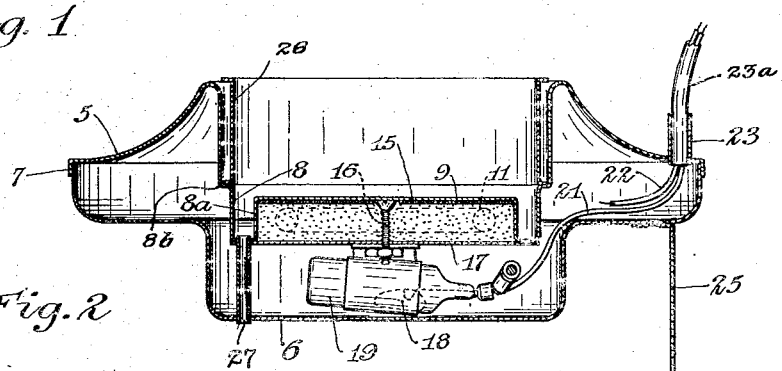
Fig. 2
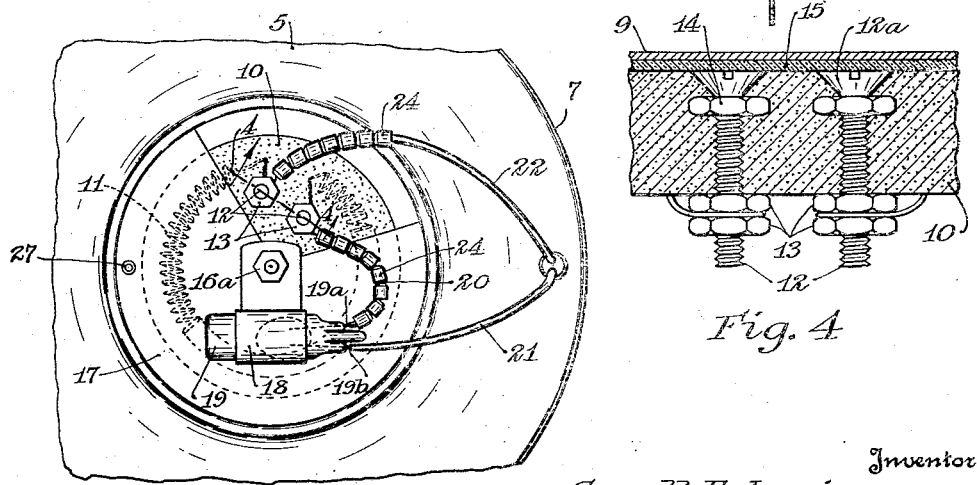
Fig. 4
Fig. 3
Inventors
Carroll E. Lewis
William H. McLelland
Robert Ferris
By Williamson & Williamson
Attorneys Patented May 23, 1933

1,909,973

UNITED STATES PATENT OFFICE

CARROLL E. LEWIS, WILLIAM H. McLELLAND AND ROBERT FERRIS, OF MINNEAPOLIS, MINNESOTA

VAPORIZER

Application filed March 2, 1931. Serial No. 519,404.

This invention relates to a simplified type of humidifier or vaporizer adapted for wide general use, such as for example in moistening, disinfecting or perfuming the air.

It is an object of our invention to provide a simple and inexpensive device for evaporating liquid at a uniform and predetermined rate which has a high evaporative capacity and may be operated at low cost.

Another object is to provide a humidifier or vaporizer having an evaporating chamber provided with a heating unit and having associated therewith simple and automatically controlled means for maintaining the level of the humidifying medium or liquid at a predetermined height with reference to the heating unit whereby the unit will be substantially covered at all times with a thin film of liquid.

More patricularly it is an object to provide a float-supported vaporizer associated with an open receptacle for holding water or some other humidifying medium and having an evaporating chamber provided with a heating unit and supplied with liquid from said receptacle through an intake port in the bottom of the device whereby the liquid or humidifying medium will be maintained at a constant level within the evaporation chamber, surrounding a substantial portion of the heating unit in the form of a thin film.

Another object is to provide a float-supported vaporizer of the type described associated with an open liquid receptacle wherein liquid is automatically and constantly supplied to take the place of the liquid evaporated and further wherein provision is made to shut off the heating unit automatically when the level of liquid within the receptacle falls below a predetermined height.

These and other objects and advantages of the invention will be more fully set forth in the following description made in connection with the accompanying drawing, in which like reference characters refer to similar parts throughout the several views, and in which:—

Fig. 1 is a side elevation showing an embodiment of our invention associated with the liquid in an open receptacle, the dotted lines indicating the position of the vaporizer when the level of the liquid in the receptacle has fallen below a predetermined point;

Fig. 2 is a vertical section through our humidifier or vaporizer;

Fig. 3 is a fragmentary bottom plan view of the upper shell of the humidifier casing detached, showing the electrical connections and the mercury tube switch, and

Fig. 4 is an enlarged fragmentary cross section taken on the line 4—4 of Fig. 3 and showing the manner in which the electrical terminals are secured to the heating unit.

Our improved humidifier or vaporizer may be associated with any open liquid re- receptacle R which is of larger diameter.

The device comprises a symmetrical casing constituting a float and as shown comprising an upper shell 5 and a lower shell 6, said shells having telescoping edges which may be soldered or otherwise secured together at 7 to form an air-tight joint. Upper shell 5 is provided with a central depending substantially cylindrical evaporating chamber 8, the lower portion of which constitutes a liquid receptacle and has formed therein an annular groove 8a surrounding an integral housing portion 9 wherein a heating unit is mounted. The heating unit may conveniently comprise a disk or pad 10 constructed of alundum cement, porcelain or some other satisfactory dielectric material having embedded therein an annularly arranged electrical heating element 11. As shown the ends of heating element 11 depend through the bottom of pad 10 and are secured to electrical terminals 12 by the clamping nuts 13. Terminals 12 may be in the form of bolts which extend through the dielectric pad 10, the heads 12a being embedded in the top of the pad and if desired additional retaining nuts 14 may be applied to the bolts adjacent the heads thereof and embedded in the dielectric material to more thoroughly secure the terminals against turning. A sheet of mica 15 or other dielectric material is disposed between the top of the pad 10 and the housing portion 9 of the upper shell.

The heating unit may be secured to housing portion 9 of shell 5 in any suitable manner and as shown, a central depending bolt 16 is secured by welding or brazing to the center of housing portion 9 extending through an aperture in the mica sheet 15 and through the dielectric pad 10. A clamping nut 16a engages the lower end of said bolt to secure the heating unit to the shell and a retaining disk 17 is interposed between the bottom of pad 10 and the clamping nut, said disk having a sector thereof cut out to expose the electric terminals 12 of the heating unit.

Bolt 16 and nut 16a also rigidly secure a small mounting bracket 18 below the heating unit, as shown, said bracket having a tubular supporting portion inclined slightly from the horizontal and wherein a conventional mercury tube switch 19 is fixed. Switch 19 is provided with the terminals 19a and 19b, the first of which is connected with one of the heating element terminals 12 by means of a short conductor 20 and the second of which, 19b, is connected with an insulated supply conductor 21. A second supply conductor 22 is connected with the second terminal 12 of the heating element and said conductor, with conductor 21, extends upwardly through the interior of the float casing and through a sleeve 23 seated in the outer portion of upper shell 5 and through a suitable water-proof conduit or cord 23a which may have a plug (not shown) attached to the outer end thereof for connection with an electrical socket. Conductor 20 and a portion of conductor 22 may have mounted thereon a series of insulating beads 24 which prevent wearing of the insulation on the conductors through contact with the edges of the casing.

The joined shells 5 and 6, it will be seen, form a casing having a substantial air chamber therein and the bottom of shell 6 is spaced a sufficient distance below the bottom of the heating unit to nicely accommodate the mercury tube switch.

The mercury tube 19 is tilted in such a manner that when the float casing is disposed horizontally the mercury in the tube will run to the end wherein the contacts 19a and 19b are mounted, covering the same and completing the electrical circuit. A depending leg 25 is secured to the bottom of shell 6 substantially radially aligned with mercury tube switch 19 and disposed outwardly of the end of the mercury tube which carries the electrical contacts. Leg 25 extends for some distance below the bottom of the lower shell and is adapted to engage the bottom of the liquid receptacle R when the liquid therein has fallen below a level adequate to support the float or casing in horizontal position. It will be obvious that upon further consumption or a decrease of the liquid within receptacle R the casing will be no longer supported by the liquid, but will tilt upon the lower end of leg 25 and thereby cause the mercury within tube 19 to run to the opposite end of the tube, uncovering contacts 19a and 19b and thus opening the circuit through the heating element.

A vertical collar 26 is disposed within the receptacle portion of the upper shell 5 spaced a slight distance from the cylindrical wall thereof and as shown having out-turned annular flanges, the lower of which may be supported upon a horizontal annular shoulder 8b. The upper edge of collar 26 projects slightly above the upper periphery of float casing.

An intake port 27 communicates with the groove 8a in the evaporating chamber and may comprise a short tube, the lower end of which extends through the bottom shell 6 and the upper end of which extends slightly above the bottom of groove 8a.

Operation

In operation the float casing will be supported by the water or other humidifying medium in receptacle R at substantially the level indicated in Fig. 1, the level of the water in the receptacle being slightly above that of the top of the heating unit within. Liquid enters the evaporating chamber through the intake port 27 and obviously will be maintained within the evaporating chamber precisely the height of the liquid in the receptacle, surrounding the housing 9 for the heating unit and maintaining a thin film of liquid not only above the substantial area at the top of the heating unit, but moreover because of groove 8a surrounding the periphery of the heating unit housing.

Moisture is constantly and uniformly evaporated through the heat supplied in the evaporating chamber and the evaporation is greatly facilitated due to the fact that only a thin film surrounds the heating unit. Liquid will constantly be supplied, to take the place of the liquid evaporated, through the port 27.

The vertical collar 26 directs the vapor upwardly from the evaporating chamber and since it projects slightly above the upper end of the float casing, prevents external currents of air being directed downwardly into the evaporating chamber. The vapors are thus guided or directed upwardly and condensation of moisture is prevented about the upper edge of the casing.

It will be noticed that the float casing is so constructed that the heated walls of the evaporating chamber are thoroughly insulated by air chambers, preventing loss of heat by transmission or radiation and the liquid in the receptacle R is quite unaffected by the heat from the heating element.

Upon consumption of the liquid in the receptacle R below a certain level the lower end of leg 25 will first engage the bottom of the receptacle and subsequent consumption of the liquid will cause the entire casing to tilt, as indicated in the dotted lines in Fig. 1, causing the mercury within the mercury tube switch 19 to run to the opposite end, uncovering contacts 19a and 19b and thus opening the circuit through the heating element. Thus the heat is automatically cut off when the water or humidifying medium within the receptacle falls below a predetermined level preventing injury to the parts of the device through overheating.

From the foregoing description it will be obvious that we have provided an extremely simple and highly efficient vaporizer or humidifier having a relatively large evaporative capacity and adapted to be manufactured at very low cost.

It will, of course, be understood that various changes may be made in the form, details, proportions and arrangement of the parts, without departing from the scope of our invention, which, generally stated, consists in a device capable of carrying out the objects above set forth, and in the novel parts and combinations of parts disclosed and defined in the appended claims.

What is claimed is:—

1. A vaporizer comprising an evaporating chamber, a float chamber at least partially surrounding said evaporating chamber and connected therewith, a heating unit mounted in the bottom of said chamber and having a substantially horizontal upper surface of considerable area traversing the greater portion of said evaporating chamber and means for supplying a humidifying medium to said evaporating chamber and maintaining the level of said medium at a predetermined height within said chamber whereby the top of said heating unit will be substantially covered with a thin film of the humidifying medium.

2. A vaporizer comprising a casing having an evaporating chamber open to the atmosphere, a heating unit mounted in the bottom thereof and spaced a slight distance from the peripheral wall of said chamber to define a narrow groove for holding a thin strata of humidifying medium, said heating unit having a substantially horizontal top of considerable area and means for automatically supplying a humidifying medium to said evaporating chamber and maintaining the level of said medium slightly above the top of said heating unit.

3. In combination with an open receptacle for holding liquid, a float-supported casing in said receptacle having therein a cup-shaped evaporating chamber open to the atmosphere, said evaporating chamber having a relatively small liquid intake port extending through the bottom of said casing and in communication with the liquid within said receptacle, a heating unit mounted in the bottom of said chamber and having an exposed top of substantial area disposed slightly below the maintained level of said liquid and traversing most of the cross sectional area of said evaporating chamber.

4. The structure set forth in claim 3 wherein an upstanding collar is mounted in said evaporating chamber, the upper end thereof spaced from and extended slightly above the upper end of said chamber.

5. In combination with an open receptacle for holding liquid, a float-supported vaporizer mounted in said receptacle and having an evaporating chamber open to the atmosphere, said chamber having a liquid intake port through the bottom thereof, communicating with the liquid in said receptacle and adapted to supply liquid to said chamber and maintain the level of said liquid at a predetermined height, an electrical heating unit mounted in said chamber and means cooperating with the bottom of said receptacle for automatically opening the electrical circuit through said heating unit when the level of liquid in said receptacle has fallen below a predetermined height.

6. In combination with an open receptacle for holding liquid a float-supported vaporizer mounted in said receptacle and having an evaporating chamber open to the atmosphere, said chamber having a liquid intake port through the bottom thereof communicating with the liquid in said receptacle and adapted to supply liquid to said chamber and maintain the level of said liquid at a predetermined height, an electrical heating unit mounted in said chamber, a gravity actuated switch mounted in said vaporizer and adapted to close the circuit through said heating unit when the vaporizer is normally supported by the liquid in said receptacle, said vaporizer having a depending projection adapted to engage the bottom of said receptacle to tilt said vaporizer when the liquid level in the receptacle has fallen below a predetermined height whereby said switch will open the circuit.

7. A vaporizer comprising a casing having a closed bottom and constituting at the outer portion thereof a float chamber, said casing also constituting an evaporating chamber disposed inwardly of said float chamber, said evaporating chamber having its upper portion in communication with the atmosphere and having a relatively small liquid intake port through the bottom thereof, said float chamber causing the level of liquid within said evaporating chamber to be maintained at a predetermined height and a heating unit mounted within the bottom of said evaporating chamber and having a substantially horizontal top traversing the greater part of the cross sectional area of said evaporating chamber and disposed just below the liquid level of said evaporating chamber.

8. In combination with an open receptacle for holding liquid, a vaporizer comprising a casing constituting an annularly arranged float chamber, the central portion within said casing constituting an evaporating chamber the bottom of which is disposed below the normal floating level of said casing, said evaporating chamber having its upper portion in communication with the atmosphere and having a relatively small liquid intake port extending through the bottom of said casing, said float chamber and said intake port causing liquid to be maintained within said evaporating chamber at a predetermined height and a heating unit mounted within the bottom of said evaporating chamber and having a top traversing the greater part of the cross sectional area of said evaporating chamber and disposed just below said liquid level.

In testimony whereof we affix our signatures.

CARROLL E. LEWIS.
WILLIAM H. McLELLAND.
ROBERT FERRIS.